United States Patent [19]
Crean

[11] Patent Number: 4,746,164
[45] Date of Patent: * May 24, 1988

[54] MOTORHOMES

[75] Inventor: John C. Crean, Corona del Mar, Calif.

[73] Assignee: Fleetwood Enterprises, Inc., Riverside, Calif.

[*] Notice: The portion of the term of this patent subsequent to Mar. 1, 2005 has been disclaimed.

[21] Appl. No.: 23,959

[22] Filed: Mar. 10, 1987

Related U.S. Application Data

[63] Continuation of Ser. No. 768,714, Aug. 23, 1985, abandoned.

[51] Int. Cl.⁴ .............................................. B60P 3/36
[52] U.S. Cl. .................. 296/164; 296/37.14; 296/156
[58] Field of Search ............ 296/37.1, 37.2, 37.14, 296/37.16, 37.6, 156, 164, 203, 204, 168; 280/5 R, 5 A, 7, 5 D

[56] References Cited

U.S. PATENT DOCUMENTS

| | | | |
|---|---|---|---|
| 1,428,239 | 9/1922 | Kelly | 296/24 R |
| 1,466,539 | 8/1923 | Martin et al. | 296/24 R |
| 1,632,360 | 6/1927 | Wilson | 296/24 R |
| 2,189,139 | 2/1940 | Fox | 280/785 |
| 2,808,892 | 10/1957 | Walker | 280/5 A X |
| 3,165,350 | 1/1965 | Willson | 296/156 |
| 3,254,914 | 6/1966 | Steck | 296/181 |
| 3,287,058 | 11/1966 | Wells | 296/37.14 |
| 3,557,272 | 3/1971 | Low | 296/156 |
| 3,565,480 | 2/1971 | McCollum et al. | 296/168 |
| 4,128,270 | 12/1978 | Legueu | 280/5 A X |
| 4,159,844 | 7/1979 | Weiner | 296/37.1 |
| 4,652,041 | 3/1987 | Barber et al. | 296/171 |
| 4,653,125 | 3/1987 | Porter | 4/321 X |

FOREIGN PATENT DOCUMENTS

| | | | |
|---|---|---|---|
| 329680 | 5/1930 | United Kingdom | 296/37.1 |
| 2088789 | 6/1982 | United Kingdom | 296/37.6 |

OTHER PUBLICATIONS

Motoroam Industries of America advertisement, no date; 1 sheet.

Primary Examiner—Robert B. Reeves
Assistant Examiner—Russell D. Stormer
Attorney, Agent, or Firm—Edward D. O'Brian

[57] ABSTRACT

A conventional motorhome can be improved by using joists to elevate the floor of the living area of the motorhome to the level of the floor in the driver's compartment in the motorhome. Preferably tanks as are required in connection with the motorhome are located in spaces between the joists.

7 Claims, 2 Drawing Sheets

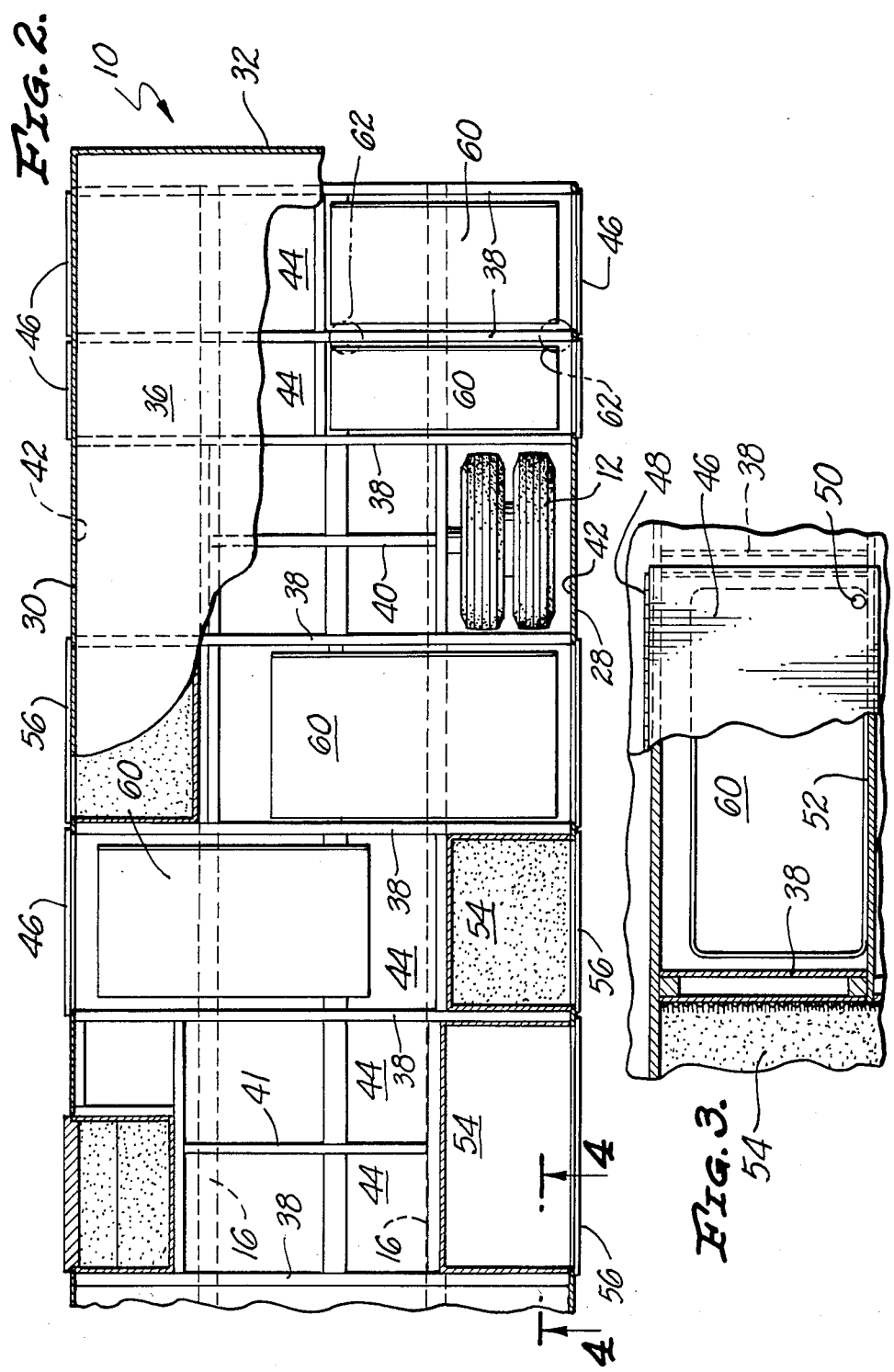

MOTORHOMES

This is a continuation of the abandoned application Ser. No. 768,714, filed Aug. 23, 1985, now abandoned.

BACKGROUND OF THE INVENTION

The invention set forth in this specification pertains to new and improved motorhomes.

This term or expression "motorhome" is of comparatively recent origin. It is now commonly utilized to designate a motor vehicle constructed so as to be capable of being utilized as at least a temporary place of residence as well as a motor vehicle. Many different types of motorhomes have been constructed and used. Most commonly most motorhomes are constructed utilizing conventional or nearly conventional motor vehicle parts and/or components. It is considered that an understanding of this invention will be expedited by defining parts of a motor vehicle and of a motorhome.

Motorhomes are normally built utilizing what is referred to as a "chassis" of a motor vehicle. As used in this specification this term is employed to designate all of the mechanical components of a motorhome except the wheels which are normally obtained from an automotive manufacturer. Thus, this expression does not include any sort of a floor structure, any sort of a body structure, the vehicle wheels or the like, but does include various mechanical components such as the motor, the axles, control pedals, steering wheel and the like and the chassis frame upon which these and other items are mounted which are required in a motor vehicle. Most commonly this chassis frame includes two, somewhat parallel elongated members which extend between the front and rear ends of the chassis. The chassis frame is normally utilized for the purpose of directly or indirectly supporting the vehicle body.

As used herein this term "vehicle body" includes a shell-like structure which extends over the chassis in order to enclose the usable space within a motorhome and to enclose or cover various parts of the chassis itself. Thus, this term "vehicle body" includes that portion of the vehicle directly or indirectly supported on the chassis which encloses the area of the chassis where various controls and the like for operating the vehicle are located as well as the areas in back of this portion of the chassis extending towards the rear of the vehicle.

The term "driving compartment" is normally employed and is used herein in order to designate that portion of the interior of the vehicle body where these controls are located and where an individual operating the vehicle will normally sit. This term "driving compartment" also is used herein to designate adjacent areas within the body of the vehicle such as a location where a passenger sitting parallel to the driver of the vehicle will sit. In the usual motorhome construction the driving compartment will contain an upwardly extending housing or cover towards the front of the drivers compartment located midway between the sides of the vehicle body. Such a housing serves to isolate those using the motorhome from the motor and other functional components of the vehicle.

Because of the manner in which vehicle chassis are normally made the floor of the driver's compartment in a motorhome will normally be located somewhat further from the ground than those portions of the floor of the motorhome located on the chassis frame to the rear of the driver's compartment. This has resulted in the interiors of common motorhomes being constructed on two different levels with the floor of the driver's compartment at one level and the floor of the motorhome at a lower level. As a consequence of this the interiors of the motorhomes constructed as indicated in the preceding are normally divided up by a step located between the floor of the driver's compartment and the motorhome floor.

Although unquestionably the type construction indicated in the preceding discussion is serviceable it is considered that this type of construction is disadvantageous. On occasion individuals are apt to trip when walking from the floor of the driver's compartment to the floor of the living area of the vehicle or vice versa. Further, those sitting on chairs, a sofa or the like located on the floor of the motorhome will be at a lower level than those sitting in the driver's compartment. Since individuals frequently like to be on approximately the same level when holding social conversation as a consequence of this difference in levels conversation between those sitting in the driver's compartment and those sitting on the floor of the motorhome proper is placed at something of a handicap. While this may not be of significance while a motorhome is driven from one location to another it becomes reasonably important when a motorhome is utilized for recreational or living purposes.

The known construction of motorhomes indicated in the preceding discussion is also considered disadvantageous because of another collateral matter. This concerns the problem of storage space encountered in connection with motorhomes and more specifically the storage of various containers or tanks as are needed in connection with the operation of a motorhome and the storage of miscellaneous items such as luggage, beach chairs, tools and so on. With current construction in which the motorhome floor is mounted directly upon the vehicle chassis there is a somewhat limited problem of where to put and how to mount these various different tanks, and in particular where to put such tanks so that the weight is satisfactorily distributed and so that they can be easily serviced. The existing motorhome structures are not considered to provide adequate, accessible storage space for miscellaneous items as noted.

BRIEF SUMMARY OF THE INVENTION

It is believed that it will be apparent from the foregoing that there is a need for new and improved motorhomes and, more specifically, for motorhomes which overcome the problem of the driver's and motorhome floors being at different levels and the other problem of providing easily accessible, easily used space for mounting various different tanks and handling various different types of storage in a motorhome. The present invention is intended to satisfy the needs indicated in the preceding discussion. It is further intended to provide motorhomes which may be easily and conveniently manufactured at a comparatively nominal cost and which may be satisfactorily utilized with little or no difficulty.

In accordance with this invention these objectives are achieved by providing in a motorhome including a chassis, said chassis having front and rear ends, sides extending between said ends and a chassis frame extending generally between said ends and located so as to be accessible at the top of said chassis, said motorhome also including wheel means for supporting said chassis on the ground and motor means for use in connection with said wheel means in order to propel said motorhome, said motorhome further including a driver's compartment located on said chassis frame adjacent to the front end of said chassis, said driver's compartment floor being located higher above the ground than that part of said chassis frame to the rear of said driver's compartment floor, said motorhome also including a motorhome floor supported by said chassis frame so as to extend generally from the rear of said driver's compartment floor to the rear of said chassis and body means enclosing space above said driver's compartment floor and said motorhome floor, the improvement which comprises:

joist means for supporting said motorhome floor located on and secured to said chassis frame to the rear of said driver's compartment floor, said joist means including a plurality of vertically oriented joists spaced from one another and extending parallel to one another generally between the sides of said motorhome, said joist means serving to position said motorhome floor a sufficient distance above the ground so that the said motorhome floor is on the same level as said driver's compartment floor, and a series of tanks, each of said tanks serving a function in connection with said motorhome, each of said tanks being located in a space between adjacent joists above said chassis and below said motorhome floor.

BRIEF DESCRIPTION OF THE DRAWINGS

Because of the nature of this invention is is best more fully described with reference to the accompanying drawings in which:

FIG. 2 is a partial cross-sectional view taken at line 2—2 of FIG. 1;

FIG. 3 is a partial side elevational view at an enlarged scale in which approximately a half of the view is in cross-section in order to clearly illustrate the construction involved.

Figure 1:
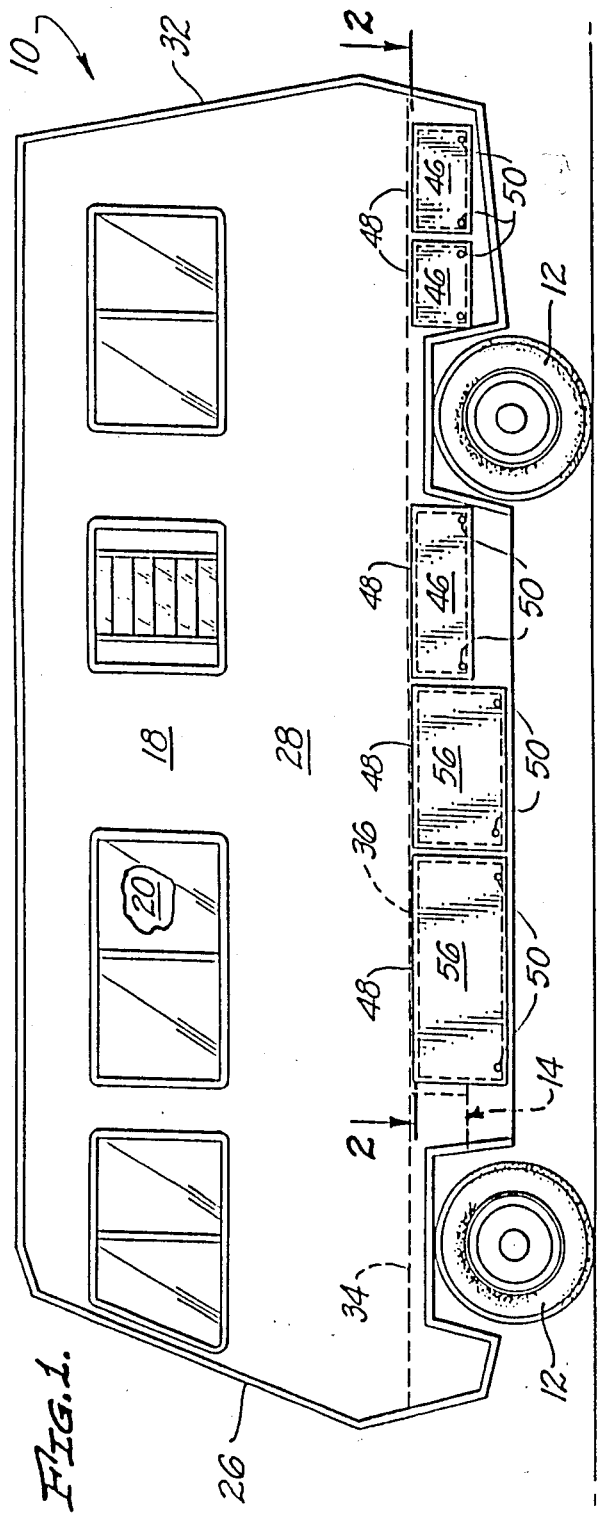
FIG. 1 is a side elevational view of a presently preferred embodiment of a motorhome in accordance with this invention.

The particular motorhome illustrated in the drawings utilizes the operative concepts or principles of this invention as are defined or summarized in the appended claims. Those skilled in the field of the construction and design of motorhomes will realize that these operative concepts or principles may be easily employed in motorhomes which differ significantly from the motorhome illustrated in appearance and construction through the use and exercise of routine engineering skill in the noted field. For these reasons the accompanying drawings are not to be considered as limiting this invention. Instead it is to be considered as being limited solely by the appended claims.

DETAILED DESCRIPTION

In the drawings there is shown a motorhome 10 in accordance with this invention which utilizes conventional wheels 12 to support a conventional chassis 14. It will be realized from a careful review of the drawings that only a small portion of the chassis 14 is illustrated and that this portion is illustrated in phantom lines. Such phantom lines are also utilized to illustrate a chassis frame 16, which forms a vital necessary part of the chassis 14 and the complete motorhome 10. It is not considered necessary to completely illustrate the chassis 14 and the chassis frame 16 because these items are so well known in the automotive and motorhome industry.

The motorhome 10 includes an enlarged body 18 located above the chassis 14 so as to enclose its interior 20 of the complete motorhome 10. This body 18 is indirectly carried by the chassis 14 as is conventional in the industry and a subsequently indicated in this specification. The interior 20 of the body 18 may be considered to consist of two separate parts: a driver's compartment 22 and a living area 24. The driver's compartment 22 is located immediately adjacent to the front end 26 of the motorhome 10 so as to extend between the sides 28 and 30 of this motorhome 10. The living area 24 is located so as to extend from immediately in back of the driver's compartment 22 to the rear end 32 of the complete motorhome 10.

A driver's compartment floor 34 is mounted in the driver's compartment 22 in a conventional manner generally on and above the chassis 14. Although this floor 34 is indicated as being flat in FIG. 1 of the drawing it will normally be broken up to accomodate and extend over various parts of the chassis 14 located beneath it. No effort has been made in the drawing to illustrate the usual driver's and passenger's chairs in the driver's compartment 22 or any of the controls or other items normally located in this compartment. This is because these items are not necessary to an understanding of the present invention.

Figure 4:
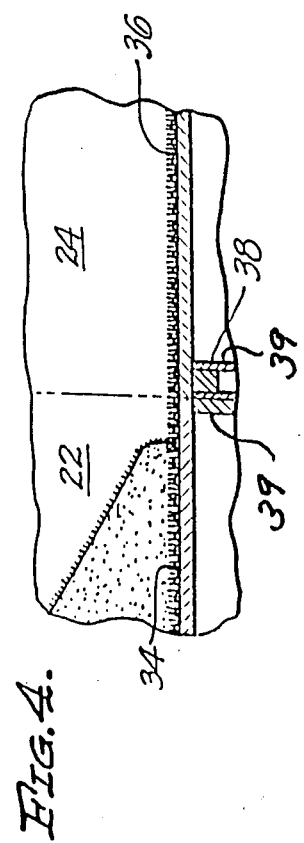
FIG. 4 is a partial cross-sectional view at an enlarged scale taken at line 4—4 of FIG. 2.

In the living area 24 a motorhome floor 36 is located above the chassis frame 16 through the use of a series of joists 38. These joists 38 are hollow joists having flat, parallel, spaced sides 39 as illustrated in FIG. 4 and are located so as to be supported on and so as to extend transverse to the frame 16 as shown in FIG. 12. Except as noted they extend generally between the sides 28 and 30. If desired these joists 38 may be referred to as "joist means." It will be apparent that these joists 38 are positioned so as to be spaced from and so as to be parallel to one another. Inasmuch as the wheels 12 normally extend somewhat above the chassis frame 16 a particular joist 40 located in the general vicinity of the wheels 12 does not extend completely to the sides 28 and 30 but only extends to the wheel wells 42 located beneath the motorhome floor 36 adjacent to these particular wheels 12. Another joist 41 beneath the driver's compartment 22 is similarly situated.

These joists 38 are spaced so as to provide a series of spaces 44 which extend between the sides 28 and 30 and which are substantially uniform in cross sectional configuration at all points between the sides 28 and 30. These spaces 44 are all located generally in back of the driver's compartment floor 34 and to the front or the rear of the wheel wells 42.

Conventional doors 46 are located in the sides 28 and 30 of the body 18 so as to provide access to these spaces 44. These doors 46 can be mounted through the use of conventional hinges 48 and can be secured in place by conventional latches 50. Normally a sub-floor 52 will be located beneath the joists 38 so as to enclose the spaces 44 and so as to make it easier to use these spaces as subsequently described.

If desired downward extending lockers or containers 54 may be constructed on various of the joists 38 and the joist 41 to provide spaces or compartments 56 which are adapted to contain comparatively large items such as a generator or luggage (not shown) generally to one side of the chassis frame 16 and beneath the motorhome floor 36. These lockers 54 extend downwardly from the joists 38. The particular doors 56 used with these compartments 54 will, of course, be somewhat larger than the other doors 46.

These doors 46 normally will correspond to the dimensions of the spaces 44 so as to permit rectilinear tanks 60 dimensioned so as to fit closely within these spaces 44 to be inserted within these spaces 44 and to be removed from them for such servicing as cannot be performed without removing them from the spaces 44. Each of the tanks 60 used serves a function in connection with the use or operation of the motorhome 10. Thus, for example, one of the tanks 60 can be used for fresh or relatively pure water, another for fuel such as gas or diesel fuel, a third for so-called gray water which is only contaminated to a limited degree and a fourth for so-called black water consisting primarily of sewage material.

These tanks 60 can be dimensioned and located as desired by a manufacturer in accordance with the interior structure of the motorhome so as to be accessible where the tanks are needed and so that the tanks will serve to "balance" the weight of the complete motorhome in such a manner that the motorhome floor will not tilt or slant any significant or noticeable degree as a result of the tanks being either filled or empty. The tanks 60 will normally be connected up to either the engine (not shown) in the chassis 14 or to wash basins, sinks, toilet or bathing facilities in the motorhome 10 in an appropriate, conventional manner.

Because they are connected in a conventional manner no effort has been made to illustrate the lines and the like used to connect the tanks 60 to various operative parts of the motorhome 10. It is considered to be within routine skill to pass such lines either through the subfloor 52 and then along the chassis 14 or to pass such lines as desired through the individual joists 38. Normally various other lines and ducts (not shown) will be passed in a similar manner generally beneath the subfloor 52 and where necessary through the motorhome floor 36 and/or various joists 38 so that such lines and ducts lead to various locations as reasonably necessary within the body 18 of the complete motorhome 10. It is not considered necessary to show such other lines and ducts inasmuch as they are of a conventional category and are used essentially in a conventional manner. Generally when they pass through the spaces 44 between the motorhome floor 36 and the subfloor 52 they will be located so as to not to interfere with the placement of the various tanks 56.

On occasion it may be necessary or advisable to heat one or more of these various tanks 60 when the motorhome 10 is in use so as to keep the contents of these tanks 60 from freezing and/or so as to lower the viscosity of the content of these tanks. Whenever this is desired it is possible to provide small openings 62 in the motorhome floor 38 which may be utilized to convey or circulate hot air from the interior 20 of the body 18 to the various individual spaces 44. If desired air return openings 64 can also be provided. These openings 62 and 64 will, of course, normally will be covered by a grill (not shown). This method of conveying hot air from the interior 20 of the body 18 is effective because of the enclosed character of the spaces 44 described.

In the preceding no effort has been made in order to specifically describe the various different types of fasteners and the like used to secure the various parts described to one another. It is considered that matters such as this are within normal routine skill in the field of the design and construction of motorhomes. It is also felt that it is within the skill of the art to make other changes in the precise structure illustrated. Thus, for example, the subfloor 52 can, if desired, be eliminated, although this is not normally considered preferable because of the function of the subfloor in enclosing the various spaced 44 described in the preceding. By virtue of the fact that these spaces 44 are enclosed the tanks 58 and the various connections to them will be protected from ambient conditions such as might cause corrosion or such as might result in the accumulation of deposits interfering with these tanks being serviced.

It is not considered that details such as the precise manner in which the body 18 is secured to the joists 38 and so on are important with respect to the invention. It is considered, however, that it is important to note that both the driver compartment floor 34 and the motorhome floor 36 are located so that they form a flat, contiguous floor which, in effect, is one floor. This of course, eliminates the danger of any step causing someone to trip. It also facilitates desired eye contact between those using seats (not shown) in the driver's compartment 22 and those utilizing seats or the like located in the living area 24. These benefits are achieved by the concurrent achievement of spaces such as the spaces 44 which can be utilized in connection with tanks or other items which need to be stored in connection with a complete motorhome 10. As pointed out in the preceding the storage features of this motorhome 10 are considered to be important and significant.

I claim:

1. In a motorhome including a chassis, said chassis having front and rear ends, sides extending between said ends and a chassis frame extending generally between said ends and located so as to be accessible at the top of said chassis, said motorhome also including wheel means for supporting said chassis on the ground and motor means for use in connection with said wheel means in order to propel said motorhome, said motorhome further including a driver's compartment located on said chassis frame adjacent to the front end of said chassis, said driver's compartment floor being located higher above the ground that that part of said chassis frame to the rear of said driver's compartment floor, said motorhome also including a motorhome floor supported by said chassis frame so as to extend generally from the rear of said driver's compartment floor to the rear of said chassis and body means enclosing space above said driver's compartment floor and said motorhome floor, the improvement which comprises:

joist means for supporting said motorhome floor located on and secured to said chassis frame to the rear of said driver's compartment floor, said joist means including a plurality of vertically oriented joists spaced from one another and extending parallel to one another generally between the sides of said motorhome, said joist means serving to position said motorhome floor a sufficient distance above the ground so that the said motor home floor is on the same level as said driver's compartment floor, and a series of tanks, each of said tanks serving a function in connection with said motorhome, each of said tanks being located in a space between adjacent joists above said chassis and below said motorhome floor, door means for enclosing spaces between at least some of said joists so as to enclose at least some of said tanks, said door means providing access to those of said tanks located between joists adjacent to said door means, storage locker means located at the sides of said body means between some of said joists, said storage locker means extending downwardly from said joists and being accessible from the exterior of said motorhome.

2. A motorhome as claimed in claim 1 wherein:

said motorhome includes wheel wells located beneath said motorhome floor, those of said joists which are located adjacent to said wheel wells do not extend to the sides of said body means so as provide room to accomodate said wheel means, and said tanks are located in spaces between adjacent joists other than the spaces which do not extend to the sides of said body means.

3. A motorhome as claimed in claim 1 including:

subfloor means located underneath said joist means between said joist means and said chassis frame.

4. A motorhome as claimed in claim 1 including:

air circulation means for circulating air through at least one of said spaces.

5. A motorhome as claimed in claim 4 wherein:

said air circulating means are located in said motorhome floor and permit the circulation of air adjacent to at least one tank.

6. A motorhome as claimed in claim 1 including:

said motorhome includes wheel wells located beneath said motorhome floor, those of said joists which are located adjacent to said wheel wells do not extend to the sides of said body means so as provide room to accomodate said wheel means, and said tanks are located in spaces between adjacent joists other than the spaces which do not extend to the sides of said body means, storage locker means located at the sides of said body means between some of said joists, said storage locker means extending downwardly from said joists and being accessible from the exterior of said motorhome, subfloor means located underneath said joist means between said joist means and said chassis frame, door means for enclosing spaces between at least some of said joists so as to enclose at least some of said tanks, said door means providing access to those of said tanks located between joists adjacent to said door means, air circulation means for circulating air through at least one of said spaces.

7. In a motorhome including a chassis, said chassis having front and rear ends, sides extending between said ends and a chassis frame extending generally between said ends and located so as to be accessible at the top of said chassis, said motorhome also including wheel means for supporting said chassis on the ground and motor means for use in connection with said wheel means in order to propel said motorhome, said motorhome further including a driver's compartment located on said chassis frame adjacent to the front end of said chassis, said driver's compartment floor being located higher above the ground than that part of said chassis frame to the rear of said driver's compartment floor, said motorhome also including a motorhome floor supported by said chassis frame so as to extend generally from the rear of said driver's compartment floor to the rear of said chassis and body means for enclosing space above said driver's compartment floor and said motorhome floor, the improvement which comprises:

hollow joist means having flat, parallel spaced sides for supporting said motorhome floor located on and secured to said chassis frame to the rear of said driver's compartment floor, said joist means including a plurality of vertically oriented joists spaced from one another and extending parallel to one another generally between the sides of said motorhome, said joist means serving to position said motorhome floor a sufficient distance above the ground so that the said motorhome floor is on the same level as said driver's compartment floor, and a series of tanks, each of said tanks serving a function in connection with said motorhome, each of said tanks being located in a space between adjacent joists above said chassis and below said motorhome floor, door means for enclosing spaces between at least some of said joists so as to enclose at least some of said tanks, said door providing access to those of said tanks located between joists adjacent to said door means, storage locker means located at the sides of said body means between some of said joists, said storage locker means extending downwardly from said joists and being accessible from the exterior of said motorhome.

* * * * *